3,343,171
GEODESIC LENS SCANNING ANTENNA
Robert M. Goodman, Jr., Marietta, Ga., assignor to Georgia Tech Research Institute, Atlanta, Ga., a corporation of Georgia
Filed Aug. 1, 1963, Ser. No. 299,240
6 Claims. (Cl. 343—754)

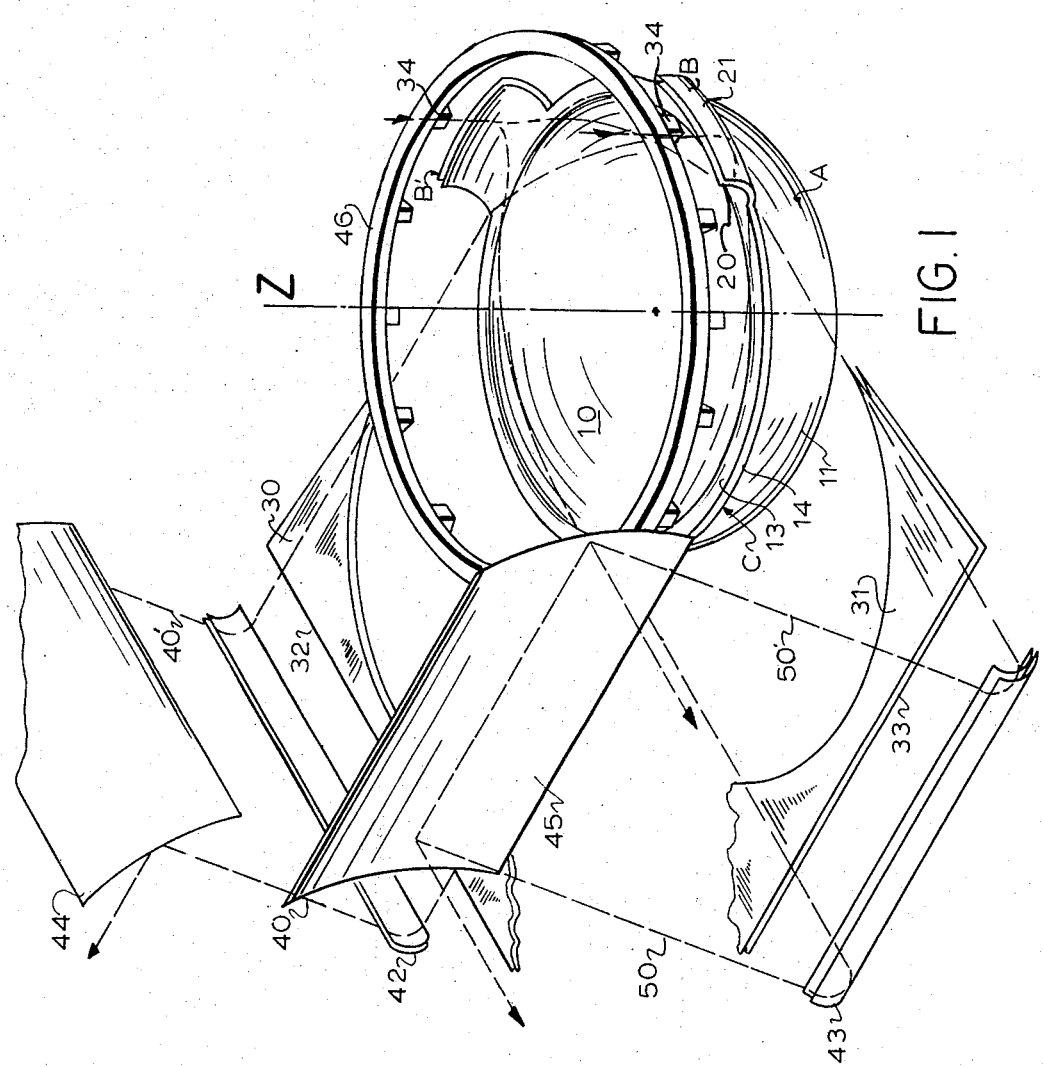
FIG. I
INVENTOR.
ROBERT M. GOODMAN JR.
BY Newton, Hopkins & Jones
ATTORNEYS United States Patent Office 3,343,171
Patented Sept. 19, 1967

This invention relates to geodesic Luneberg lenses and more particularly to a geodesic lens conductor for use in a scanning antenna or in similar applications.

The geodesic Luneberg lens is a wave guide analog of a two-dimensional slice through a three-dimensional Luneberg lens and comprises two closely spaced conducting surfaces with the normal separation between the conducting surfaces being everywhere constant. A geodesic lens is substantially bowl shaped and when a geodesic lens is used to conduct electro-magnetic energy it is thought that the electro-magnetic energy follows the mean plane between the two conducting surfaces and it is known that rays of electro-magnetic energy leaving a point source on the periphery of a geodesic lens emerge from the geodesic lens diametrically opposite to the point source as a collimated beam. Similarly, it is known that the rays of a collimated beam of electro-magnetic energy entering a geodesic lens are brought to a focal point on the periphery of the geodesic lens diametrically opposite to a line tangent to the geodesic lens in the collimated beam.

A geodesic curve is the shortest distance in a curved surface between two points and the relationship between a collimated beam and a point source of electro-magnetic energy established by a geodesic lens is achieved by forming the two conducting surfaces to provide a mean plane that has geodesic paths of equal length from a single point on the periphery of the geodesic lens to all points on a line tangent to the periphery diametrically opposite the single point. Since a geodesic lens may be used in the transmission or reception of electro-magnetic energy, it is customary to identify portions of a geodesic lens in terms of their functions in the transmission of the electro-magnetic energy while understanding that their functions may be reversed.

In terms of electro-magnetic energy transmission, a geodesic lens customarily has an input lip and an output lip, and when a geodesic lens is utilized in a scanning antenna, it is customary to use a lens feed horn to feed electro-magnetic energy to the input lip, flat plate extensions to extend the output lip to the tangential line of emission of electro-magnetic energy from the geodesic lens, a reflector assembly, and a parabolic-cylinder reflector. The geodesic lens and flat plate extensions transform a point source of electro-magnetic energy at the lens feed horn and input lip into a linear wave of electro-magnetic energy instant upon the reflector feed assembly. The reflector feed assembly directs the electro-magnetic energy to the parabolic-cylinder reflector from which the electro-magnetic energy is reflected toward the target. The angle of instance of the collimated beam of electro-magnetic energy in the reflector feed assembly and the angle or scan of the irradiated beam as it leaves the parabolic-cylinder reflector is changed by moving the lens feed horn along the input lip.

When a plurality of lens feed horns are carried by a rotating ring in a manner which causes the lens feed horns to traverse the input lip in sequence, a scanning antenna using a geodesic lens is capable of rapidly scanning a sector with the motion of only the relatively light weight rotating ring. This allows the more massive components of the scanning antenna to remain stationary while providing scan speeds rivalling completely electronic scanning. Moreover, rapid transition from scan mode to search light or track mode can be obtained from most applications of a geodesic lens. Thus, a geodesic lens possesses many advantages when used in scanning antenna applications.

Although the specific dimensions of a geodesic lens will depend upon the particular application and the wave length at which it is to be operated, previous geodesic lenses have been of several basic types. These previous types of geodesic lenses are the tin hat, helmet and clamshell types. The tin hat type of geodesic lens has the configuration suggested by its type name and its entire surface can be manufactured as a full figure of revolution about a central axis. Thus, the tin hat type of geodesic lens possesses the advantage of being easy and convenient to manufacture. In addition, this configuration provides the tin hat type of geodesic lens with good nesting characteristics where it is desired for operational or other reasons to nest or position a geodesic lens within another geodesic lens.

However, the tin hat type of geodesic lens is characterized by being difficult to feed with most types of feeds and by being impossible to feed by some excellent types of feed. Moreover, the input lip of a tin hat type of geodesic lens makes lens focusing adjustments extremely difficult to accomplish. As a result of these limitations, a tin hat type of geodesic lens is not well adapted to use in a scanning antenna.

The clamshell type of geodesic lenes has the configuration suggested by its name and is characterized by an input lip over and extending downward into a bowl shaped portion. This positioning of the input lip of the clamshell type geodesic lens makes it impossible to nest one clamshell type of geodesic lens within another clamshell type of geodesic lens where it is desired for operational or other reasons to nest or position a geodesic lens within another geodesic lens. Moreover, the position of the input lip of the clamshell type geodesic lens makes it impossible to manufacture a clamshell type of geodesic lens as a single full figure of revolution. This makes a clamshell type of geodesic lenes relatively expensive to manufacture.

In addition, the position of the input lip of a clamshell type of geodesic lens makes the clamshell type of geodesic lens relatively difficult to feed with the feed systems utilizing a rotating ring. This is because the rotating ring must be suspended and rotated within the bowl shaped portion of the clamshell type of geodesic lens. The output lip of a clamshell type of geodesic lens is outward of and continuous with the periphery of the bowl shaped portion of the geodesic lens and the position of the input lip also causes a clamshell type of geodesic lens to have transition portions between the input lip and the output lip which distort electro-magnetic energy.

These transition portions of a clamshell type of geodesic lens limit the width of the collimated beam which may be transmitted or received using the geodesic lens since the collimated beam must be narrow enough to not traverse a transition portion in its path from the input lip to the output lip of the geodesic lens. Since the aperture efficiency of a geodesic lens is the ratio of the width of the collimated beam which may be transmitted or received without distortion using the geodesic lens to the diameter of the geodesic lens, these transition portions of a clamshell type of geodesic lens limit the aperture efficiency obtainable with a clamshell type of geodesic lens.

Moreover, the transition portions prevent a clamshell type of geodesic lens from being efficiently used with a plurality of input and output lips to simultaneously or sequentially scan collimated beams in two orthogonal scan sectors. This is because the electro-magnetic beam emitted from or received by a second input lip will traverse the transition portion between the first input lip and output lip.

The helmet type of geodesic lens is an effort to avoid some of the limitations and disadvantages of the tin hat type of geodesic lens and the clamshell type of geodesic lens. As suggested by its type name, the helmet type of geodesic lens is characterized by an input lip and an output lip positioned on the periphery of a bowl-shaped portion. The output lip is a substantially horizontal extension of the bowl-shaped central portion and the input lip extends above the bowl-shaped portion and the output lip of the geodesic lens as a partial cylinder which is substantially continuous with the curvature of the bowl-shaped portion.

The cylindrical character of the input lip of a helmet type of geodesic lens makes focusing adjustments of a helmet type of geodesic lens relatively easy to accomplish since they can be made by simply varying the position of an input horn along the vertical dimension of the input lip. Moreover, this partial cylinder configuration of the input lip of a helmet type of geodesic lens makes the lens relatively easy to feed by most feed systems including a feed system utilizing a rotating ring.

However, the vertical position of the input lip at the periphery of the bowl portion makes a helmet type of geodesic lens difficult to nest within another helmet type of geodesic lens where operational or other reasons require nesting. Moreover, like the clamshell type of geodesic lens, the helmet type of geodesic lens is characterized by transition portions between the input lip and the output lip. These transition portions limit the aperture efficiency which can be obtained with a helmet type of geodesic lenses and also limit its usefulness where it is desired to use a plurality of output and input lips to simultaneously or sequentially scan beams in two orthogonal scan sectors.

In addition, the input lip of the helmet type of geodesic lens must be separately manufactured and separately mounted on the geodesic lens. Thus, like the clamshell type of geodesic lens, the entire surface of a helmet type of geodesic lens can not be manufactured as a single full figure of revolution. As a result, a helmet type of geodesic lens is relatively expensive to manufacture.

The geodesic lens disclosed herein completely overcomes the foregoing difficulties with previous types of geodesic lenses. It is a geodesic lens in which each conducting surface can be manufactured as a single full figure of revolution about an axis. It is for this reason as easy, convenient and relatively inexpensive to manufacture as a tin hat type of geodesic lens. The geodesic lens of the invention has the usual bowl-shaped central portion, an output lip integral with the central portion and which may be continuous with the central portion around the entire periphery of the central portion, and an input lip which is a partial cylinder and which is joined by a semi-toroid to the outermost edge of the output lip.

There are no transition portions between an input lip and the output lip and two input lips located ninety degrees apart on the outermost edge of the output lip can be used without loss of aperture efficiency to simultaneously or sequentially scan beams in two orthogonal scan sectors. This is because, without transition portions between the output lip and the input lips, only an input lip and the semi-toroid joining it to the outermost edge of the output lip need to be avoided by the electro-magnetic energy in order to prevent distortion of the electro-magnetic energy. Moreover, since the output lip of the geodesic lens may exist around the entire periphery of the central portion and since the input lips of the geodesic lens exist simply as extensions from the outermost edge of the output lip, the positions of a plurality of input lips may be varied within this limitation to meet varying scanning requirements. It is simply necessary that the electro-magnetic energy not actually traverse an input lip and the semi-toroid joining it to the output lip.

The forming of input lips as extensions from the outermost edge of the output lip makes the geodesic lens of the invention easy to nest or position within a similar geodesic lens where operational or other reasons make the nesting of one geodesic lens within another geodesic lens desirable. Moreover, since each input lip is a partial cylinder, the geodesic lens of the invention retains the advantage of the helmet type of geodesic lens in that focusing adjustments can be made by simply varying the position of an input horn along the vertical axis of the input lip.

These and other features and advantages of the invention will be more clearly understood from the following detailed description and the accompanying drawings in which like charatcers of reference designate corresponding parts in all figures and in which:

FIG. 1 is an exploded perspective view of an embodiment of the geodesic lens of the invention used in a scanning antenna with two orthogonal scan sectors.

Figure 3:
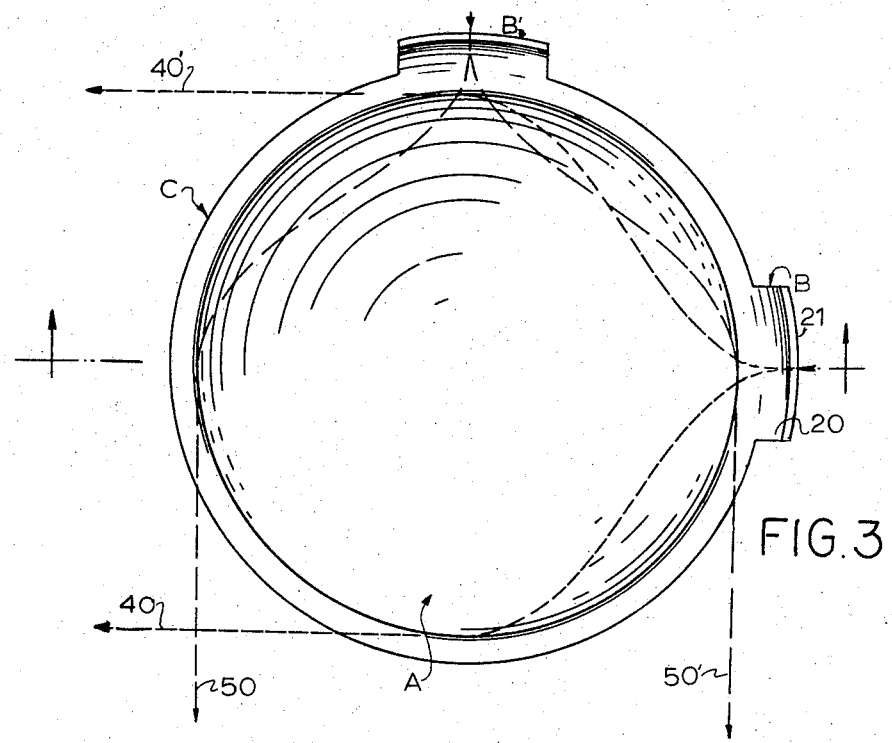
FIG. 3 is a top plan view of the geodesic lens shown in FIG. 2 and with the outer limits for two undistorted electro-magnetic beam patterns having good aperture efficiency schematically shown in dashed outline.
Figure 2:
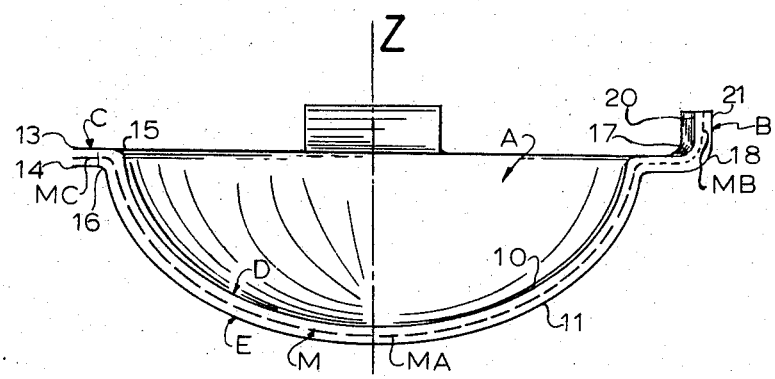
FIG. 2 is a side elevational view of an embodiment of the geodesic lens of the invention having input lips positioned in those locations which permit it to be used in the scanning antenna of FIG. 1.

These figures and the following detailed description disclose a preferred specific embodiment of the invention but the invention is not limited to the details disclosed since it may be embodied in other equivalent forms.

The geodesic lens of the invention is best understood as comprising a central portion generally indicated by the letter A, an input lip generally indicated by the letter B, and an output lip generally indicated by the letter C. The nomenclature chosen for the input lip B and the output lip C is chosen in terms of their functions in a transmitting antenna. However, it is to be understood that the geodesic lens of the invention may be used either for the transmission or reception of electro-magnetic energy and that this nomenclature has been chosen only as a matter of convenience.

The central portion A of the geodesic lens comprises two bowl shaped conducting plates 10 and 11. The inner conducting plate 10 is nested within the outer conducting plate 11 and the inner conducting plate 10 and outer conducting plate 11 are both symmetrical and full figures of revolution about an axis Z. The inner conducting plate 10 is uniformly spaced apart from the outer conducting plate 11 throughout the entire area of the inner conducting plate 10. The uniform space between the conducting plates 10 and 11 will depend in known manner upon the wave length of the electro-magnetic energy to be transmitted or received with the geodesic lens and on other known considerations.

Concentric with the circular periphery of the inner conducting plate 10 is an inner output lip plate 13 and concentric with the circular periphery of the outer conducting plate 11 is an outer output lip plate 14. The output lip plates 13 and 14 are in planes of reference perpendicular to the axis Z and spaced apart to the same extent as the conducting plates 10 and 11 of the central portion A. Together the output lip plates 13 and 14 form the output lip C of the geodesic lens and similar to the conducting plates 10 and 11, the output lip plates 13 and 14 are symmetrical and full figures of revolution about the axis Z.

An inner connector semi-toroid 15 joins the inner conducting plate 10 to the inner output lip plate 13 and an outer connector semi-toroid 16 joins the outer conducting plate 11 to the outer output lip plate 14. The connector semi-toroids 15 and 16 are spaced apart to the same extent as the conducting plates 10 and 11 and permit electromagnetic energy to pass without distortion in known manner from between the conducting plates 10 and 11 to between the output lip plates 13 and 14. The connector semi-toroids 15 and 16 are symmetrical and full figures of revolution about the axis Z.

Continuous with the outermost edge of the inner output lip plate 13 is an inner input lip semi-toroid 17 and continuous with the outermost edge of the outer output lip plate 14 is an outer input lip semi-toroid 18. The input lip semi-toroids 17 and 18 are spaced apart to the same extent as the conducting plates 10 and 11 and are symmetrical and portions of full figures of revolution about the axis Z.

The inner input lip semi-toroid 17 and the inner connector semi-toroid 15 are both tangent to a plane of reference perpendicular to the axis Z where they join the inner output lip plate 13. Similarly, the outer input lip semi-toroid 18 and the outer connector semi-toroid 16 are both tangent to a plane of reference perpendicular to the axis Z where they join the outer output lip plate 14. The output lip plates 13 and 14 are in these parallel planes of reference and in the specific embodiment of the invention shown in the figures, the output lip plates 13 and 14 are just sufficiently wide to provide surfaces perpendicular to the axis Z for joining the input lip semi-toroids 17 and 18 to the connector semi-toroids 15 and 16 in the manner described. However, where it is desired for operational or other reasons, the output lip plates 13 and 14 may have greater width.

The input lip semi-toroids 17 and 18 and connector toroids 15 and 16 extend in opposite directions from the planes of reference to which they are tangent and continuous and integral with that edge of the inner input lip semi-toroid 17 most remote from the outermost edge of the inner output lip plate 13 is an inner input lip plate 20. Continuous and integral with that edge of the outer input lip semi-toroid 18 most remote from the outermost edge of the outer output lip plate 14 is an outer input lip plate 21. The input lip plates 20 and 21 are symmetrical about the axis Z and together form the input lip B of the geodesic lens. The input lip plates 20 and 21 are spaced apart to the same extent as the conducting plates 10 and 11 and extend above the central portion A of the geodesic lens as portions of cylindrical surfaces which are full figures of revolution about the axis Z.

The inner conducting plate 10, the inner connector semi-toroid 15, the inner output lip plate 13, the inner input lip semi-toroid 17, and the inner input lip plate 20 together form the inner conducting surface D of the geodesic lens of the invention. Similarly, the outer conducting plate 11, the outer connector semi-toroid 16, the outer output lip plate 14, the outer input lip semi-toroid 18, and the outer input lip plate 21 together form the outer conducting surface E of the geodesic lens of the invention. It is between the conducting surfaces D and E of the geodesic lens of the invention that electro-magnetic energy is conducted in accordance with known principles when the geodesic lens of the invention is used in a scanning antenna or in other applications.

Since it is thought by those skilled in the art that the path of electro-magnetic energy as it traverses a geodesic lens is defined by a mean plane between conducting surfaces, it is the configuration of a mean plane M between the conducting surfaces D and E which determines the configuration of the geodesic lens of the invention. The mean plane M is a plane of reference between the conducting surfaces D and E of the geodesic lens which is everywhere equidistant from both the conducting surface D and the conducting surface E and the configuration of the geodesic lens is most easily understood by considering the mean plane M to have a bowl shaped central portion MA, a semi-cylindrical section defining an input lip MB and an annular portion defining an output lip MC and joined to both the central portion MA and the input lip MB by semi-toroidal portions.

The conducting surfaces D and E of the geodesic lens are formed in accordance with known techniques and principles so that all paths from a focal point selected in known manner on the input lip MB to a line tangent to the output lip MC at a point diametrically opposite the focal point are geodesic curves of equal length. Since all portions of the geodesic lens of the invention are symmetrical about the axis Z, the selected focal point in the input lip MB may be any point along a line of intersection between a plane of reference perpendicular to the axis Z and the input lip MB. Thus, a point source of electro-magnetic energy moving along this line of intersection will produce a collimated beam moving in a corresponding manner at the output lip MC diametrically opposite which can be used in known manner in a scanning antenna.

The focusing of the collimated beam is easily accomplished with the geodesic lens of the invention by simply adjusting the vertical position of the point source of electro-magnetic energy in the input lip MB. Thus, the geodesic lens is focused in the same manner as the helmet type of geodesic lens. However, unlike the helmet type of geodesic lens, the input lip B of the geodesic lens of the invention is more remote from the axis Z than the central portion A or the output lip C. Thus, when it is desired to nest one geodesic lens within another geodesic lens for operational or other reasons, the input lip B does not engage the output lip C and prevent nesting. If the input lip B of a first geodesic lens is displaced about the axis Z from the position of the input lip B of a second geodesic lens, two geodesic lenses of the invention may be easily and conveniently nested with the outer conducting surface E of one geodesic lens engaging the inner conducting surface D of the other geodesic lens.

The inner conducting plate 10, the inner connector semi-toroid 15, the inner output lip plate 13, the inner input lip semi-toroid 17, and the inner input lip plate 20 of the inner conducting surface D are full figures or portions of full figures of revolution about the axis Z with each figure of revolution being displaced from other figures of revolution along the axis Z. Similarly, the outer conducting plate 11, the outer connector semi-toroid 16, the outer output lip plate 14, the outer input lip semi-toroid 18, and outer input lip plate 21 are full figures or portions of full figures of revolution about the axis Z with each figure of revolution being displaced from all figures of revolution along the axis Z. Thus, the conducting surfaces D and E may each be regarded as a single full figure of revolution about the axis Z. As a result, the conducting surfaces D and E may be formed by turning, spinning or similar operations in accordance with known machine shop techniques. After the conducting surfaces D and E are initially formed in this manner, the desired width of the input lip B is obtained by cutting away excess material using known techniques. There is no necessity for welding or other fastening operations and as a result the geodesic lens of the invention is easy, convenient and inexpensive to manufacture.

In addition, the forming of the input lip B of the geodesic lens of the invention as an extension from the outermost edge of the output lip C avoids the transition portions between output lips and input lips which have characterized previous geodesic lenses. Moreover, the output lip C surrounding the entire periphery of the central portion A provides a uniform distortion-free path for electro-magnetic energy from an input lip positioned at any point on the edge of the output lip C provided the path does not traverse another input lip. It is because of this that the geodesic lens of the invention provides good aperture efficiency since the width of a collimated beam emitted from an output lip C can closely approximate the diameter of the geodesic lens.

The lack of transition portions and the extent of the output lip C also permit a plurality of input lips B to be used where it is desired to obtain the simultaneous or sequential emission of a plurality of collimated beams. The specific embodiment of the invention shown in the drawings has two input lips B and B'. Since there are no transition portions between the output lip C and the input lips B and B′, it is simply necessary that the collimated beam originating at the input lip B not traverse the input lip B′ and that the collimated beam originating at the input lip B′ not traverse the input lip B. It will be understood that although the output lip C may extend completely around the periphery of the central portion A, it may be limited to those portions from which an input lip B extends and to those portions which functionally serve as an output lip C.

The geodesic lens of the invention is well suited to use in a scanning antenna as shown in FIG. 1. The scanning antenna comprises a geodesic lens of the invention having two input lips B and B′ positioned ninety degrees apart along the outermost edge of the output lip C. Diametrically opposite the input lip B is a flat plate extension 30 continuous with the output lip C and diametrically opposite the input lip B′ is a flat plate extension 31 continuous with the output lip C.

The flat plate extension 30 extends the conducting surfaces D and E of the geodesic lens to an outer edge 32 parallel to a tangent to the output lip C at a point diametrically opposite the midpoint of the input lip B and the flat plate extension 31 extends the conducting surfaces D and E to an outer edge 33 parallel to a tangent to the output lip C at a point diametrically opposite the midpoint of the input lip B′. It is from the outer edge 32 of the flat plate extension 30 that a collimated beam is emitted when electro-magnetic energy is introduced as a point source by a horn 34 of known type at the input lip B and it is from the outer edge 33 of the flat plate extension 31 that a collimated beam is emitted when electro-magneic energy is introduced as a point source by a feed horn 34 of known type at the input lip B′. The horns 34 may be replaced in known manner with a suitable organ pipe feed system of known type.

The output lip C is continuous around the periphery of the central portion A of the geodesic lens. This and the lack of transition portions between the output lip C and the input lips B and B′ permit the maximum width of the collimated beam emitted from the outer edge 32 of the flat plate extension 30 and the maximum width of the collimated beam emitted from the outer edge 33 of the flat plate extension 31 to be substantially as wide as the diameter of the geodesic lens. These maximum beam widths obtainable without distortion are schematically indicated in FIG. 1 by the dashed lines 40 and 40′ and 50 and 50′ respectively. The result of the maximum beam widths obtainable is that the ratio of the width of the collimated beams to the diameter of the geodesic lens, the measure of aperture efficiency, approaches maximum value. Thus, when used in a scanning antenna, the geodesic lens not only permits beams in two orthogonal scan sectors, but it also permits this arrangement of beams to be accomplished while maintaining good aperture efficiency.

As is customary with previous applications of geodesic lenses in a scanning antenna, the electro-magnetic energy emitted from the flat plate extensions 30 and 31 is directed by reflector feed assemblies 42 and 43 to parabolic-cylinder reflectors 44 and 45 and thence to the targets of the scanning antenna. Scanning motion of the beams is obtained in known manner by feeding the input lips B and B′ with a plurality of feed horns 34 carried by a rotating ring 46. The rotating ring 46 is positioned for rotational motion and rotated with respect to the input lips B and B′ in known manner. The electro-magnetic energy is fed to the feed horns 34 from apparatus (not shown) as the horns 34 traverse the input lips B and B′ using known techniques. The result of the arrangement is that the scanning antenna scans in two orthogonal scan sectors.

It will be obvious to those skilled in the art that many variations may be made in the embodiments here chosen for the purpose of illustrating the present invention without departing from the scope thereof as defined by the appended claims.

What is claimed as invention is:

1. In a conductor for electro-magnetic energy, two closely spaced conducting surfaces positioned and shaped to define between themselves a mean plane having a bowl-shaped central portion symmetrical about an axis, an angular portion extending outwardly and substantially perpendicular to said axis and joined at its innermost edge to said central portion by a first semi-toroidal portion, and a semi-cylindrical section joined at one edge to the outermost edge of said angular portion by a second semi-toroidal portion and extending from said one edge parallel to said axis, the distances through said central portion from a single point in said semi-cylindrical section to a plurality of points in a line tangential to said outermost edge of said angular portion being equal, said semi-cylindrical section being positioned for feeding at said single point by a vertically adjustable feed means which is concentrically mounted to coincide with said semi-cylindrical section so as to be laterally of said central portion.

2. The conductor of claim 1 in which said conducting surfaces are also positioned and shaped to define between themselves an extension of said mean plane to said line.

3. The conductor of claim 1 in which said conducting surfaces are also positioned and shaped to define between themselves a continuation of said mean plane including a second semi-cylindrical section joined at one edge to the outermost edge of said angular portion by a third semi-toroidal portion and extending from said one edge parallel to said axis.

4. The conductor of claim 1 in which said line is tangential to said outermost edge of said angular portion at a point diametrically opposite said single point.

5. The conductor of claim 1 in combination with a reflector feed assembly means for feeding electro-magnetic energy from said line to a parabolic cylinder reflector.

6. The conductor of claim 5 in which said mean plane includes a second semi-cylindrical section joined at one edge to the outermost edge of said angular portion by a third semi-toroidal portion and positioned so that the distances through said central portion from a single point in said second semi-cylindrical section to a plurality of points in a second line tangential to said outermost edge of said angular portion are equal and in combination with a second reflector feed assembly means for feeding electro-magnetic energy from said second line to a second parabolic cylinder reflector.

References Cited

UNITED STATES PATENTS 2,814,040  11/1957  Warren _____ 343—909

OTHER REFERENCES

Hollis et al., A Luneberg Lens Scanning System; IRE Transactions on Antennas & Propagation, vol. AP–5, January 1957, No. 1, pages 21–25, No. TR7800 I2.

ELI LIEBERMAN, *Primary Examiner.*